United States Patent
Wang et al.

(10) Patent No.: US 8,635,526 B2
(45) Date of Patent: Jan. 21, 2014

(54) TARGET ADVERTISEMENT IN A BROADCAST SYSTEM

(75) Inventors: Jun Wang, La Jolla, CA (US); Bruce Collins, San Diego, CA (US); Christopher John Bennett, San Diego, CA (US); Charles N. Lo, San Diego, CA (US); Gordon Kent Walker, Poway, CA (US); Haipeng Jin, San Diego, CA (US); Lakshminath Reddy Dondeti, San Diego, CA (US); Randall Coleman Gellens, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 954 days.

(21) Appl. No.: 11/566,145

(22) Filed: Dec. 1, 2006

(65) Prior Publication Data
US 2008/0040666 A1    Feb. 14, 2008

Related U.S. Application Data

(60) Provisional application No. 60/809,138, filed on May 25, 2006.

(51) Int. Cl.
*G06F 17/00* (2006.01)

(52) U.S. Cl.
USPC ........... 715/255; 715/201; 715/202; 715/203; 715/204

(58) Field of Classification Search
USPC ......................................... 715/201–204, 255
See application file for complete search history.

(56) References Cited

U.S. PATENT DOCUMENTS

| | | | | |
|---|---|---|---|---|
| 5,155,591 | A | * | 10/1992 | Wachob .......................... 725/35 |
| 5,233,423 | A | * | 8/1993 | Jernigan et al. ............... 348/564 |
| 5,796,952 | A | | 8/1998 | Davis et al. |
| 6,029,045 | A | * | 2/2000 | Picco et al. ..................... 725/34 |
| 6,044,376 | A | * | 3/2000 | Kurtzman, II ................ 707/102 |
| 6,268,856 | B1 | | 7/2001 | Bruck et al. |
| 6,381,362 | B1 | * | 4/2002 | Deshpande et al. .......... 382/162 |
| 6,425,127 | B1 | * | 7/2002 | Bates et al. .................... 725/32 |
| 6,608,556 | B2 | * | 8/2003 | De Moerloose et al. ..... 340/501 |
| 6,615,251 | B1 | | 9/2003 | Klug et al. |
| 6,718,551 | B1 | * | 4/2004 | Swix et al. ..................... 725/32 |
| 6,728,730 | B1 | | 4/2004 | Muro et al. |

(Continued)

FOREIGN PATENT DOCUMENTS

| | | |
|---|---|---|
| CN | 1446415 A | 10/2003 |
| EP | 1337125 | 8/2003 |

(Continued)

OTHER PUBLICATIONS

International Search Report, PCT/US07/069787, International Search Authority, European Patent Office, Apr. 3, 2008.

(Continued)

*Primary Examiner* — Andrew Dyer
(74) *Attorney, Agent, or Firm* — The Marbury Law Group, PLLC

(57) ABSTRACT

The disclosure is directed to an access terminal. The access terminal includes a display configured to enable a user to view a presentation having content, and a processing component configured to receive the presentation and select an advertisement to insert into the content of the presentation before the presentation is provided to the display for viewing by the user.

76 Claims, 8 Drawing Sheets

(56) References Cited

U.S. PATENT DOCUMENTS

| | | | |
|---|---|---|---|
| 6,741,862 B2 | 5/2004 | Chung et al. | |
| 6,763,379 B1* | 7/2004 | Shuster | 709/224 |
| 6,774,920 B1* | 8/2004 | Cragun | 715/730 |
| 6,947,976 B1* | 9/2005 | Devitt et al. | 709/219 |
| 7,017,173 B1* | 3/2006 | Armstrong et al. | 725/87 |
| 7,136,871 B2 | 11/2006 | Ozer et al. | |
| 7,158,666 B2* | 1/2007 | Deshpande et al. | 382/162 |
| 7,158,943 B2* | 1/2007 | van der Riet | 705/14.41 |
| 7,706,740 B2* | 4/2010 | Collins et al. | 455/3.01 |
| 7,818,207 B1* | 10/2010 | Veach | 705/14.46 |
| 8,515,336 B2* | 8/2013 | Collins et al. | 455/3.01 |
| 2001/0044736 A1* | 11/2001 | Jacobs et al. | 705/7 |
| 2002/0016736 A1 | 2/2002 | Cannon et al. | |
| 2002/0168963 A1* | 11/2002 | Wajs | 455/411 |
| 2002/0196850 A1* | 12/2002 | Liu et al. | 375/240.12 |
| 2003/0033197 A1 | 2/2003 | Saga et al. | |
| 2003/0072556 A1* | 4/2003 | Okujima et al. | 386/46 |
| 2003/0110171 A1* | 6/2003 | Ozer et al. | 707/10 |
| 2003/0212762 A1 | 11/2003 | Barnes et al. | |
| 2004/0024636 A1* | 2/2004 | Jaffe et al. | 705/14 |
| 2005/0060310 A1 | 3/2005 | Tong et al. | |
| 2006/0085829 A1 | 4/2006 | Dhodapkar et al. | |
| 2007/0061023 A1 | 3/2007 | Hoffberg et al. | |
| 2007/0088852 A1* | 4/2007 | Levkovitz | 709/246 |
| 2007/0112627 A1 | 5/2007 | Jacobs et al. | |
| 2009/0210902 A1 | 8/2009 | Slaney et al. | |
| 2009/0307732 A1* | 12/2009 | Cohen et al. | 725/87 |
| 2010/0169910 A1 | 7/2010 | Collins et al. | |
| 2010/0235744 A1 | 9/2010 | Schultz et al. | |
| 2012/0089586 A1 | 4/2012 | Tong et al. | |
| 2012/0089600 A1 | 4/2012 | Tong et al. | |

FOREIGN PATENT DOCUMENTS

| | | |
|---|---|---|
| JP | H1079711 A | 3/1998 |
| JP | H11338809 A | 12/1999 |
| JP | 2000358005 A | 12/2000 |
| JP | 2001086014 A | 3/2001 |
| JP | 2001229283 A | 8/2001 |
| JP | 2001346140 A | 12/2001 |
| JP | 2002091992 A | 3/2002 |
| JP | 2002125166 A | 4/2002 |
| JP | 2002268994 A | 9/2002 |
| JP | 2002271736 A | 9/2002 |
| JP | 2002280982 A | 9/2002 |
| JP | 2002290957 A | 10/2002 |
| JP | 2002366472 A | 12/2002 |
| JP | 2003168044 A | 6/2003 |
| JP | 2003179901 A | 6/2003 |
| JP | 2004199217 A | 7/2004 |
| JP | 2005084752 A | 3/2005 |
| JP | 2005295576 A | 10/2005 |
| JP | 2005332084 A | 12/2005 |
| JP | 2006510965 A | 3/2006 |
| KR | 20010070863 A | 7/2001 |
| KR | 20010088762 A | 9/2001 |
| TW | 522386 B | 3/2003 |
| TW | 589846 B | 6/2004 |
| TW | I228893 | 3/2005 |
| TW | I237511 | 8/2005 |
| WO | 9930493 | 6/1999 |
| WO | 0059220 A1 | 10/2000 |
| WO | WO2004055807 A1 | 7/2004 |

OTHER PUBLICATIONS

Written Opinion, PCT/US07/069787, International Search Authority, European Patent Office, Apr. 3, 2008.
International Preliminary Report on Patentability, PCT/US07/069787, International Preliminary Examining Authority, European Patent Office, Munich, Germany, Sep. 3, 2008.
Taiwanese Search report—096118893—TIPO—Jul. 19, 2010, p. 1.
Taiwan Search Report—TW096118893—TIPO—Jul. 15, 2013 (Original Chinese language version—1 page).
Taiwan Search Report—TW096118893—TIPO—Jul. 15, 2013 (English translation of original Chinese language version—1 page).
Taiwan Search Report—TW101103427—TIPO—Jul. 16, 2013 (Original Chinese language version—page).
Taiwan Search Report—TW101103427—TIPO—Jul. 16, 2013 (English translation of original Chinese language version—1 page).

* cited by examiner

TARGET ADVERTISEMENT IN A BROADCAST SYSTEM

CLAIM OF PRIORITY UNDER 35 U.S.C. §119

The present Application for Patent claims priority to Provisional Application No. 60/809,138 entitled "TARGETED ADVERTISEMENT CACHING AND INSERTION IN MOBILE BROADCAST SERVICES" filed May 25, 2006, and assigned to the assignee hereof and hereby expressly incorporated by reference herein.

BACKGROUND

1. Field

The present disclosure relates generally to telecommunication systems, and more particularly, to concepts and techniques for customizing and personalizing advertisement, delivery in broadcast system.

2. Background

With the advent of digital video recorders and video demand services, viewers of multimedia broadcasts are becoming better equipped to avert generic advertising presentations. This poses an evident threat to advertisers. Unless mitigated by advertising innovations, significant advertising dollars may be lost to content providers. Accordingly, there is a need in the art for a system that prevents viewer aversion of advertisements and provides targeted advertisements to individual viewers users, tailored to their preferences, profiles, and other circumstances.

SUMMARY

An aspect of an access terminal is disclosed. The access terminal includes a display configured to enable a user to view a presentation having content, and a processing component configured to receive the presentation and select an advertisement to insert into the content of the presentation before the presentation is provided to the display for viewing by the user.

Another aspect of an access terminal is disclosed. The access terminal includes means for receiving a presentation having content, means for selecting an advertisement, means for inserting the selected advertisement into the content of the presentation, and means for displaying the presentation with the selected advertisement.

An aspect is disclosed of a method for advertising by an access terminal. The method includes receiving a presentation having content, selecting an advertisement, inserting the selected advertisement into the content of the presentation, and displaying the presentation with the selected advertisement.

An aspect is disclosed of computer readable media containing a set of instructions for a processor to perform a method of advertising by an access terminal. The instructions includes a routine to receive a presentation having content, a routine to select an advertisement, a routine to insert the selected advertisement into the content of the presentation, and a routine to provide to a display the presentation with the selected advertisement.

BRIEF DESCRIPTION OF THE DRAWINGS

Various aspects of a wireless communications system are illustrated by way of example, and not by way of limitation, in the accompanying drawings, wherein.

The various illustrative logical blocks, modules, circuits, elements, and/or components described in connection with the embodiments disclosed herein may be implemented or performed with a general purpose processor, a digital signal processor (DSP), an application specific

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
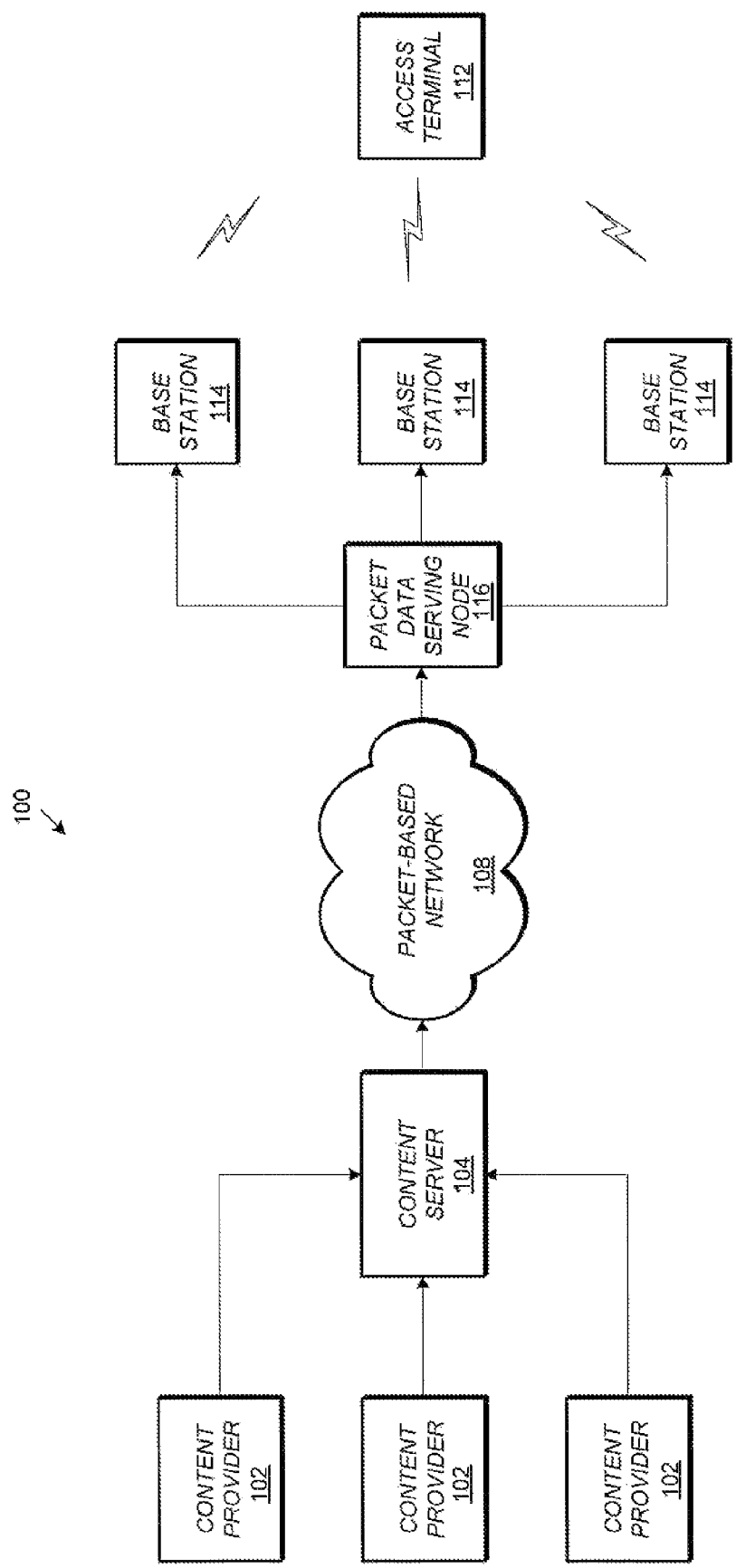
FIG. 1 is a block diagram illustrating an example of a broadcast system.

FIG. 1 is a conceptual block diagram illustrating an example of a broadcast system. The broadcast system 100 is shown with multiple content providers 102 that provide content to a content server 104. The content may include real-time and non-real-time video, audio, multimedia, media clips, scripts, programs, data, advertisements, electronic files and any other suitable content. The content from the various content providers 102 may be combined into one or more presentations by the content server 104 for distribution to subscribers over a packet-based network 108, such as the Internet, a intranet, a private Internet Protocol (IP) network, or the like.

A subscriber on an access terminal 112 may connect to the packet-based network 108 to access the presentations provided by the content server 104. Multiple base stations 114 are dispersed throughout a geographic region to provide a wireless connection to the access terminal 112. A packet data sewing node (PDSN) 116 is used to establish a network connection with the access terminals 112 and provide a gateway to the packet-based network 108.

The access terminal 112 be a mobile telephone, a personal digital assistant (PDA), a personal or laptop computer, or other device capable of receiving content. The access terminal 112 pay be referred to as a terminal, a device, a handset, a subscriber unit, a subscriber device, a wireless unit, a wireless device, a wireless communications device, a wireless telecommunications device, a wireless telephone, a cellular telephone, a user terminal, user equipment, a mobile station, a mobile unit, a subscriber station, a wireless station, a mobile radio, a radio telephone, or some other terminology. The various concepts described throughout this disclosure are intended to apply all wireless communication devices regardless of their specific nomenclature.

In FIG. 1, the interface between the access terminals 112 and the base stations 114 is wireless. The wireless connection may be implemented with any suitable air interface including, by way of example, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier ("1X") radio transmission technology (RTT), evolution data only (EV-DO) technology, general packet radio service (GPRS), enhanced data GSM environment (EDGE), high speed downlink data packet access (HSPDA), analog and digital satellite systems, IEEE 802.11, Worldwide Interoperability for Microwave Access (WiMax), or any other technologies/protocols that may be used in wireless communications. In an alternative configuration, the access terminal 112 may have a wired connection with a gateway to the packet-based network 108. The wired connection may be, by way of example, a digital subscriber line (DSL), cable modem, fiber optics, a standard telephone line, or any other suitable wired medium.

Figure 2:
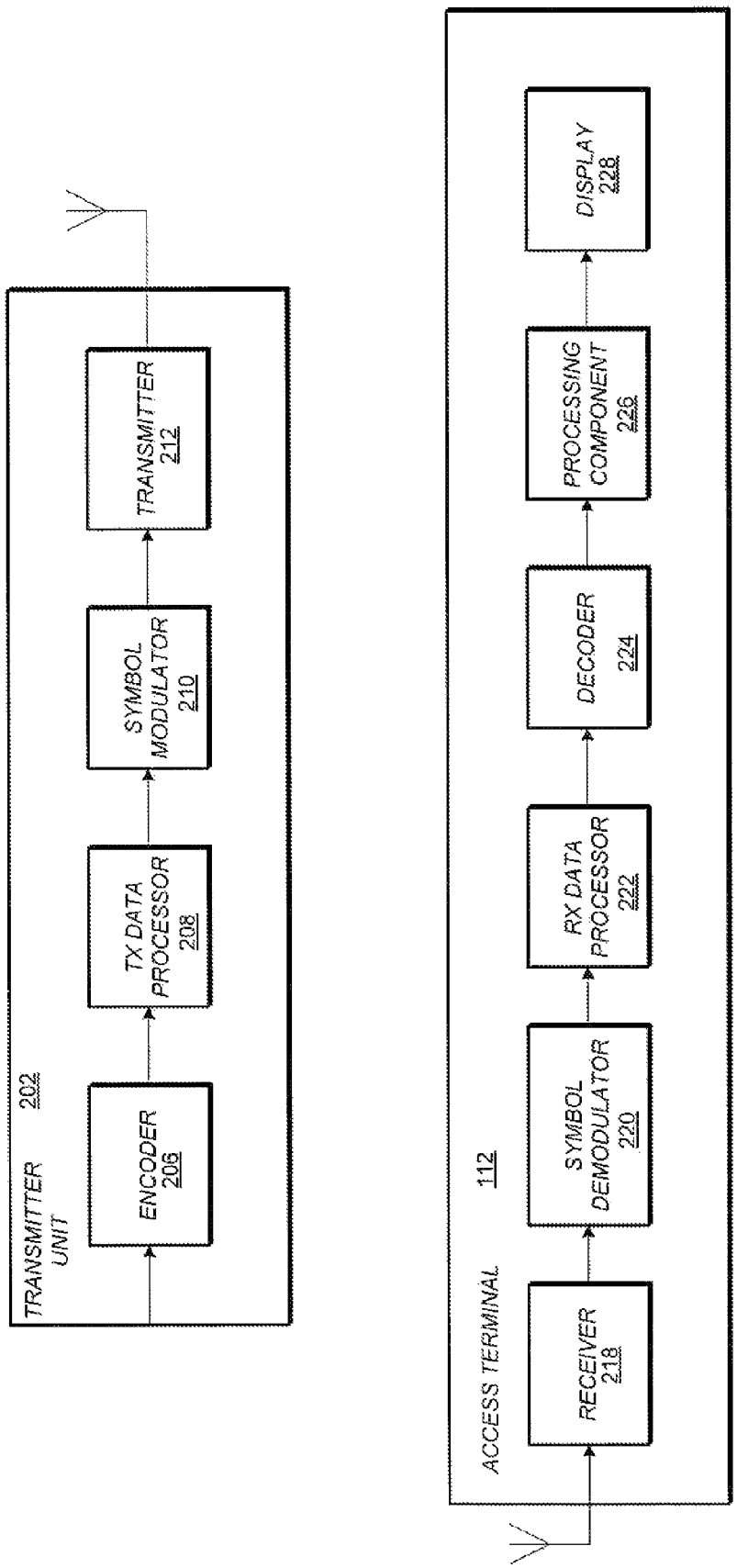
FIG. 2 is a block diagram illustrating an example of an access terminal and a transmitter unit.

FIG. 2 is a conceptual block diagram illustrating an example of an access terminal and a transmitter unit. The transmitter unit 202 is used to broadcast content to the access terminal 112. In the broadcast system shown in FIG. 1, the transmitter unit 202 is part of the base station 114. In an alternative configuration, the transmitter unit 202 may be used to deliver content to the access terminal 112 directly from the content server 104, or from a distribution center designed to deliver content to a large number of subscribers through a network of transmitters.

At the transmitter unit 202, the content is provided to an encoder 206. The encoder 206 compresses the content using any suitable compression algorithm such as H.264 or the like. A transmit (TX) data processor 208 processes (e.g., turbo encodes, interleaves, and symbol maps) the compressed content to produce a series of data symbols. A symbol modulator 210 multiplexes the data symbols with pilot symbols and provides them to a transmitter 212. The transmitter 212 processes (e.g., converts to analog, amplifies, filters, and frequency upconverts) the symbols and generates a modulated signal, which is transmitted to the access terminal 116.

At the access terminal 112, a receiver 218 processes the modulated signal (e.g., filters, amplifies, and frequency downconverts) to recover the symbols. A symbol demodulator 220 is used to demultiplex the data and pilot symbols and provide estimates of the data symbols to a receive (RX) data processor 222. The RX data processor 222 processes (e.g., symbol demaps, deinterleaves, and turbo decodes) the data symbol estimates to recover the compressed presentation. A decoder 224 decodes the output from the RX data processor 222 to recover the content. A processing component 226 is used to process the content before being presented to a display 228 for viewing by the subscriber.

As used in this disclosure, the term "processing component" is intended to refer to a processing-related entity, either hardware, a combination of hardware and software, software, of software in execution. For example, a processing component, may be, but is not limited to, a process running on a processor, a processor, an object, a thread of execution, and/or a program. In the access terminal 112, the processing component may be a separate component, distributed between multiple components, or integrated into one or more components. In addition, the processing component can execute from various computer readable media having various data structures stored thereon.

The processing component 226 may provide a variety of processing functions. One example involves the placement of advertisements in the various presentations received by the access terminal 112. In this example, each advertisement is broadcast once by the transmitter unit 202 on a dedicated logical channel and cached by the processing component 226. Once cached, the advertisement can be inserted repeatedly into the various presentations at the appropriate times. This approach tends to conserve valuable bandwidth by eliminating the need to reacquire the advertisements. Alternatively, or in addition to, the processing component 226 may cache advertisements embedded in the various presentations.

In one configuration, the advertisements are filtered before being cached to save valuable memory resources. In applications, where memory resources are not a limiting factor, the filters may be applied to the cached advertisements for selective presentation to the display 228 during the various presentations.

The processing component 226 may include one or more filters that allows the access terminal 112 to selectively cache and/of display personalized and customized advertisements. The filters may use a subscriber profile to select the advertisements to insert into the main content of the presentation. Alternatively, or in addition to, the filters may use other filtering criteria to select the advertisements such as the time of day, the channel the being viewed, the subscriber's service provider, and/or the content of the presentation (e.g., sitcom, drama, sporting event, etc.). The time of day, the channel, and the content description of each presentation may be provided by a service guide maintained by the content server 104. The content description may be broadcast to the access terminal 112 as metadata, either on an overhead channel or embedded in the main content.

The subscriber profile may include the demographics of the subscriber. The demographic information may include the subscriber's geographic location, age, gender, occupation, income, hobbies, and the like. The subscriber profile may also include the preferences of the subscriber. The subscriber's preferences may be determined by tracking various e-commerce transactions on the access terminal 116 to determine the purchasing habits of the subscriber, or monitoring the programming selected by the subscriber. The parameters used to define the subscriber's profile for any particular application will depend upon a variety of factors including the performance requirements and the overall design constraints (e.g., limited memory) imposed on the access terminal 116.

The advertisements, whether broadcast on an overhead channel or embedded in the main content of a presentation, may also include metadata. The metadata identifies the advertisement (e.g., Ad1, Ad2, Ad3, . . . ). The metadata may include additional information such as advertisement content and the attributes of the target market for the advertisement. For example, the metadata may indicate the advertisement content is directed to "sporting equipment" and the attributes of the target market is a male adult sports-fan. Each attribute may be a separate tag in the metadata (e.g., <gender: M>, <age: adult>, <preferences; sports>). Alternatively, the attributes may be represented by a bit vector in the metadata. Each bit position in the bit vector may be used to convey information that might otherwise be included in a tag.

The filters implemented by the processing component 226 may use the metadata to select the advertisements to insert in the main content. For example, the processing component 226 may implement a filter that compares the subscriber's profile with the attributes in the metadata for each advertisement and selects the advertisement with the closest match for caching and/or displaying.

In a more sophisticated example, the processing component 226 may be run multiple filters during a presentation. Each filter may be configured to implement a set of rules. In this example, a first advertisement "Ad1" includes metadata indicating that the advertisement content is directed to the sale of "ski equipment" and the target market has the following attributes: <gender: male>, <preferences: outdoors>, <preferences: skiing>. A second advertisement "Ad2" includes metadata indicating that the advertisement content includes a "car chase" and the target market has the following attributes: <age: teenager>, <preferences: sports fan>, <preferences: auto racing>. The set of rules implemented by the first filter in this example can be represented as follows:

If the subscriber's profile includes the following criteria: <gender: male> AND <subscriber preference: outdoors>, then select the first advertisement;

If the subscriber's profile includes the following criteria: <age: teenager> AND <subscriber preference: sports fan>, then select the second advertisement.

The set of rules implemented by the second filter in this example can be represented as follows:

If the subscriber's profile includes the following criteria: <age: adult> AND <subscriber preference: skiing>, then select the first advertisement;

If the subscriber's profile includes the following criteria: <subscriber profile: auto racing>, then select the second advertisement.

A cueing protocol may be broadcast from the transmitter unit 202 to the processing component 226 to identify where the advertisement should be inserted into the main content of the presentation. The cueing protocol may also include filter information. The filter information may include a filter identifier that is used by the processing component 226 to select a filter. In some configurations, the cueing protocol may include multiple filter identifiers. In these configurations, the processing component 226 uses the first fit, or the best fit, to select the advertisement to cache and/or display. The filtering information may also include filter metadata that may be used by the processing component 226 to add and delete filters, as well as update the set of rule for existing filters.

The cueing protocol may also include metadata related to the specific location of advertisements within the main content of the presentation. For example, each slot within a presentation may have a different value or cost to the advertiser. An advertising slot during halftime of the NFL Superbowl may be more expensive than a slot towards the end of the game. The value of the slot at the end of the game may be different depending on whether the game is close. The metadata in the cueing protocol may also include information related to the content of the presentation just before the advertisement slot (e.g., the preceding main content contains a car chase, ski race, or discussion on California wine). The metadata may be translated by the content server into a filter and broadcast to the access terminal 112 in the cueing protocol as filter metadata. Alternatively, the raw data may be broadcast in the cueing protocol for processing at the access terminal.

An example will useful to illustrate how the processing component 226 may use the cueing protocol, the service guide, the subscriber's profile, and the metadata associated with the advertisements. In this example, the following tags are available to the processing component 226 for an advertising slot:

Cueing protocol: <medium value spot>, <car racing in main content>
Service guide tag: <action movie>, <science fiction movie>
Subscriber's profile; <female>, <age: 30-40>, <science fiction>
Available advertisements:
   Ad1: <content: new model car>, <age: young adult>;
   Ad2: <content: car racing>, <value: low to medium>
   Ad3: <age: adult>, <preference; science fiction>, <content: new movie advertisement>, <value: medium to high>.

Although Ad2 and Ad3 match, Ad3 is a better match. Thus, the processing component 226, in this example, would select the advertisement identified as "Ad3" to insert into the main content during the slot in the presentation.

The cueing protocol may include a series of cues that is used by the processing component 226 to identify where in the main content the advertisements should be inserted. In one example, the cueing protocol comprises a series of cues. The first cue is an "event pending" (EP) cue, which prompts the processing component to begin processing an advertisement for placement into the main content of the presentation. The transmitter unit 202 may send multiple EP cues at various times prior to the advertisement. Each EP cue includes a "duration" field which indicates the time remaining before the advertisement. The second cue is an "event notification" (EN) cue. The EN cue is used to prompt the processing component 226 to insert the advertisement into the main content of the presentation. The EN cue also has a duration field that indicates the time of advertisement from start to finish. The third cue is an "event continuing" (EC) cue, which includes a duration field that indicates the time remaining before the completion of the advertisement. The transmitter unit 202 may send multiple EC cues during the presentation of the advertisement, each indicating the time remaining for the advertisement in the duration field. The fourth cue is an "event termination" (ET) cue, which prompts the processing component 226 to terminate the event.

Figure 3:
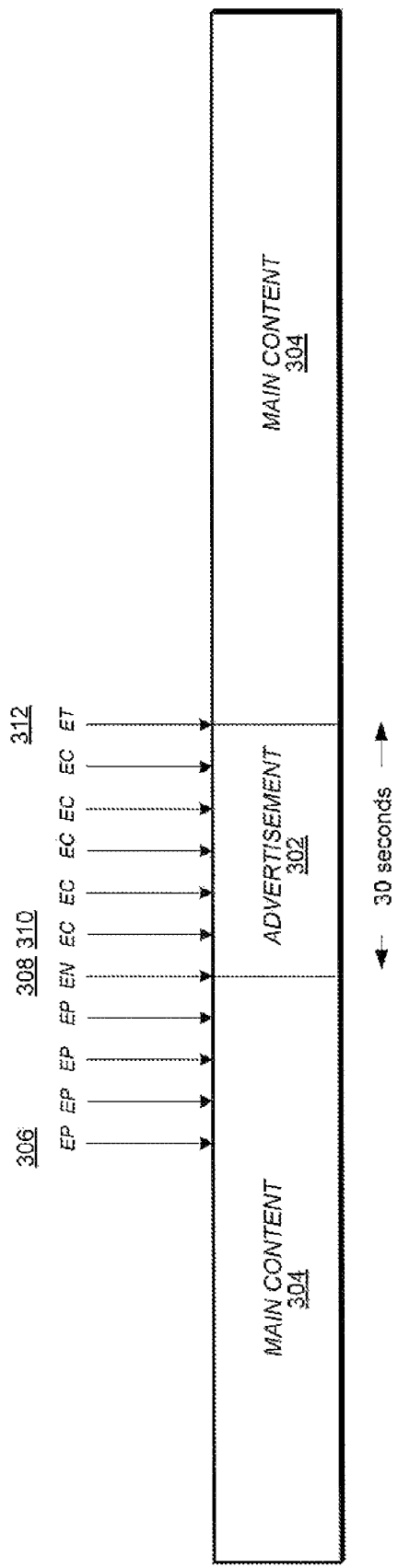
FIG. 3 is a diagram illustrating an example of the timing of cues in relation to an advertisement inserted into the main content of a presentation.

FIG. 3 is a diagram illustrating the timing of the cues in relation to an advertisement 302 inserted into the main content 304. During the presentation of the main content 304, prior to the advertisement 302, four EP cues 306 are received by the processing component. The first EP cue 306 notifies the processing component to begin an advertisement 302 in 20 seconds. The processing component receives the remaining EP cues 306 every 5 seconds with the last EP cue 306 being received 5 seconds before the advertisement 302. The EN cue 308 prompts the processing component to begin the advertisement 302. The duration field in the EN cue 308 indicates that the advertisement 302 is 30 seconds. Following the EN cue 308, the processing component receives five EC cues 310, one every 5 seconds. Each EC cue 310 includes a duration field indicating the time remaining for the advertisement 302. Finally, the ET cue 312 prompts the processing component to terminate the advertisement 302 and resume the presentation of the main content 304.

Figure 4:
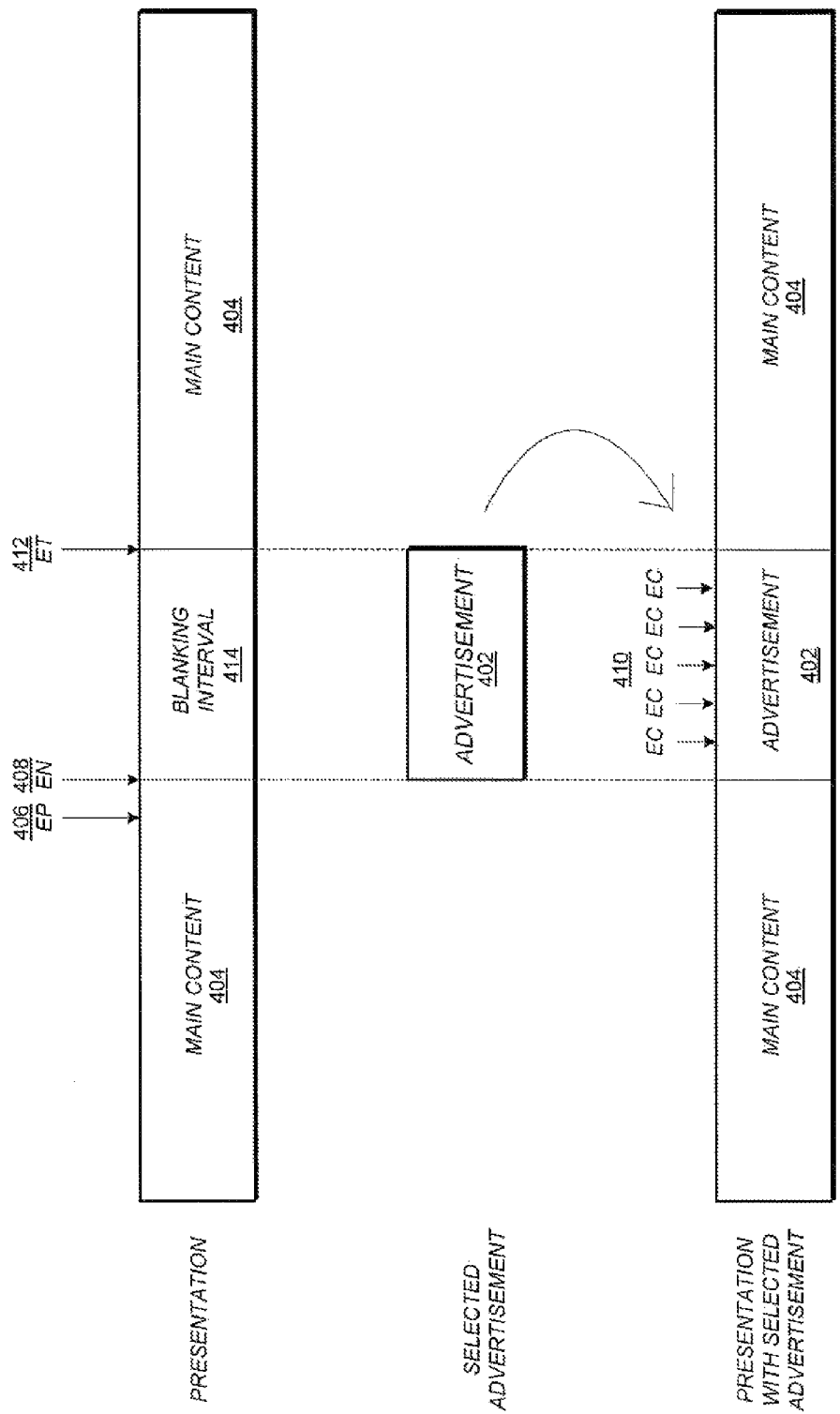
FIG. 4 is a diagram illustrating an example of the placement of advertisement in the blanking interval of a presentation.

The format of the presentation broadcast by the transmitter unit may vary. For example, the format of the presentation may include a number of blanking intervals dispersed throughout the main content. Turning to FIG. 4, a presentation 400 is shown with main content 404 and a blanking interval 414. The EP cue 406 prompts the processing component to select an advertisement 402. When the EN cue 408 is received, the processing component inserts the advertisement 402 into the blanking interval 414 of the main content 404 to create a presentation to the display of the access terminal. The EC cues 410 may be used to speed up or slow down the playback of the advertisement to ensure completion on time. The advertisement 402 is terminated and the main content 404 resumed when the ET cue 412 is received by the processing component.

Figure 5A:
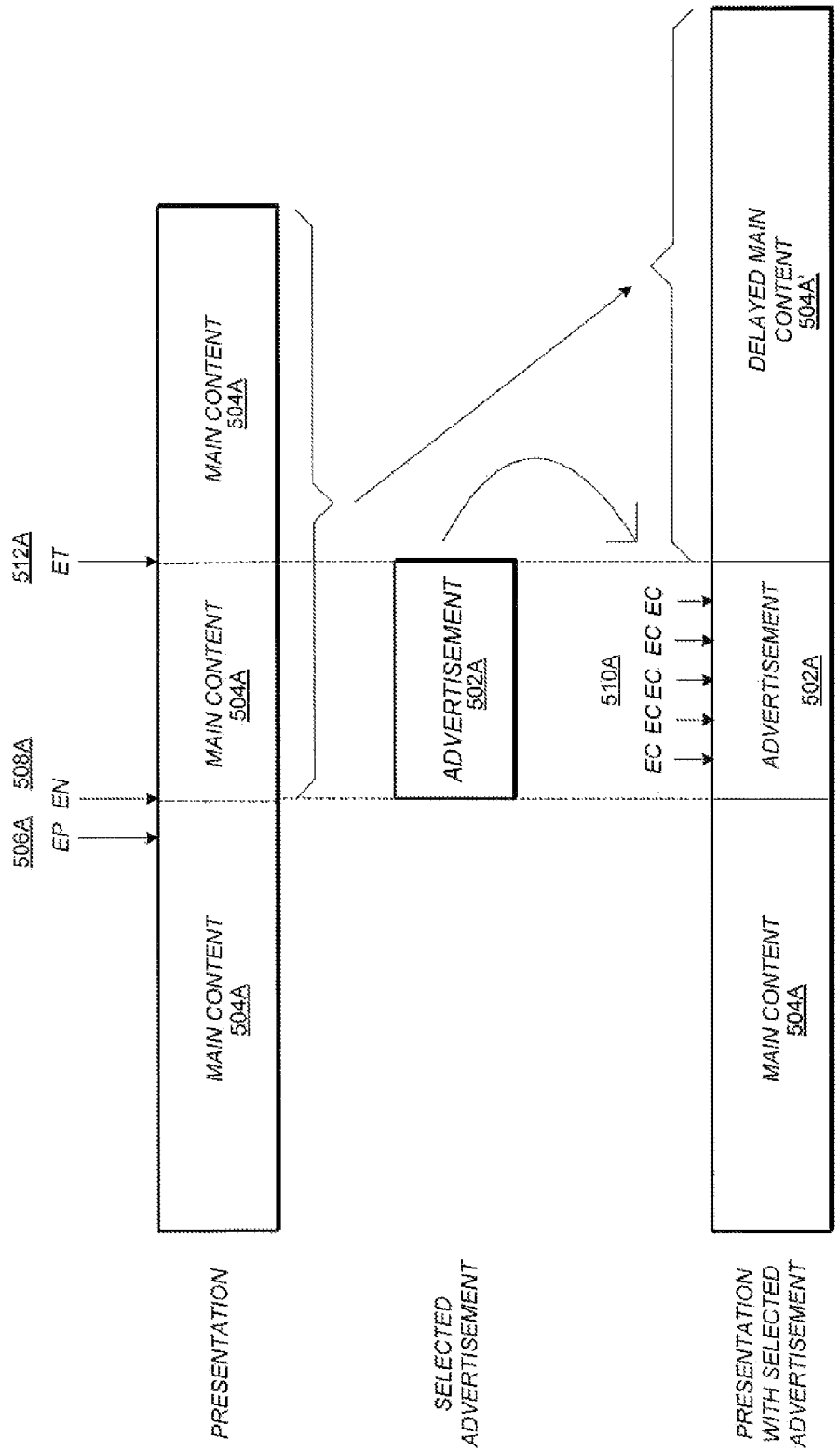
FIG. 5A is a diagram illustrating an example of the placement of an advertisement in a presentation without a blanking interval.
Figure 5B:
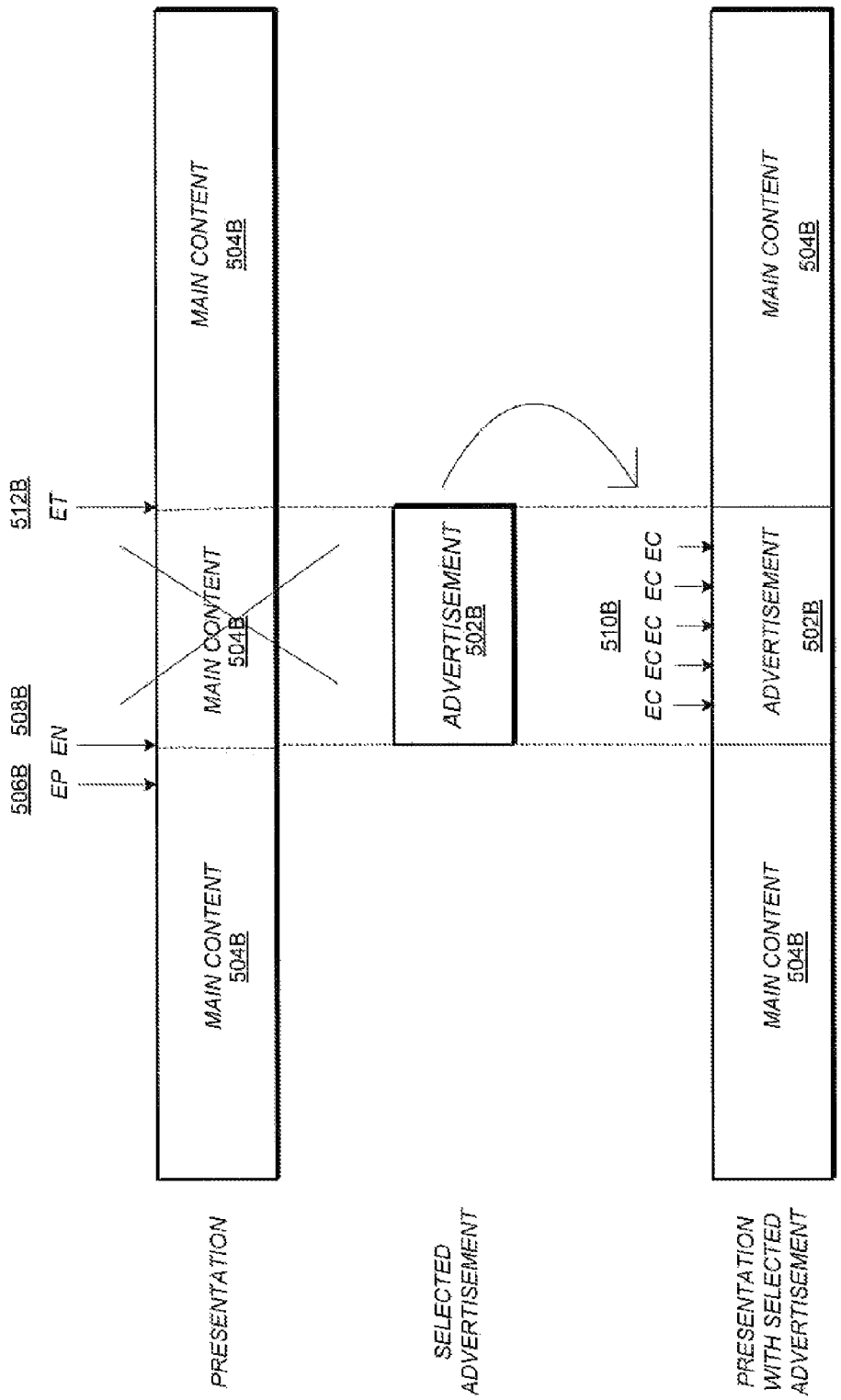
FIG. 5B is a diagram illustrating another example of the placement of an advertisement in the presentation without a blanking interval.

An alternative presentation format is shown in FIGS. 5A and 5B. The presentation format in these examples include main content only, without any blanking intervals. Referring to FIG. 5A, the processing component selects an advertisement 502A in response to an EP cue 506A. When an EN cue 508A is received, the processing component begins buffering the main content 504A of the presentation 500A and begins the advertisement 502A in the presentation 516A. The EC cues 510A may be used to speed up or slow down the advertisement to ensure completion on time. The advertisement 502A is terminated when the ET cue 512A is received by the processing component. Once the advertisement is terminated, the delayed presentation of the main content 504A' from the buffer is resumed.

Turning to FIG. 5B, the processing component selects an advertisement 502B in response to an EP cue 506B. When the EN cue 508B is received, the processing component replaces the main content 504B of the presentation with the advertisement 502B. The EC cue 510B may be used to speed up or slow down the advertisement to ensure completion on time. The advertisement 502B is terminated and the main content 504B resumed when the ET cue 512B is received by the processing component. The portion of the main content replaced by the advertisement 502B may itself be an advertisement sent from the content server or any other type of content.

The cueing protocol may be implemented in a variety of ways. In broadcasting systems that deliver content over a packet-based network, the cueing protocol may be broadcast by the transmitter unit using RealTime Transport Protocol (RTP). The cueing protocol may be a modified version of the Brassil/Schulzrinne method, which is well known in the art. Alternatively, the cueing protocol may be a new protocol. The cue packets may be embedded in the RTP stream, either in-band with media packets or as a separate RTP stream. The RTP "Payload Type" indicator may be added to identify cue packets from media packets. For non-real time applications (e.g., media clips), the well-known Synchronized Multimedia Integration Language (SMIL) may be used provide the cueing protocol using "Asynchronous Layer Coding Protocol" (ALC) as the transport layer, which forms the base of the File Delivery over Unidirectional Transport (FLUTE) protocol.

Other methods for broadcasting the cueing protocol over packet-based networks may be implemented. In real-time applications, the cueing protocol may use User Datagram Protocol (UDP) as the transport layer and specify the UDP port number. The same cueing protocol may be used for non-real time content using FLUTE/ALC as the transport layer. Alternatively, UDP may be used as a transport layer for both real-time and non-real-time content. In one configuration of a broadcast system, the cueing information can be specified in the service guide. Those skilled in the art will be readily able to determine the best method of broadcasting the cueing protocol depending on the particular application and the overall design constraints.

Figure 6:
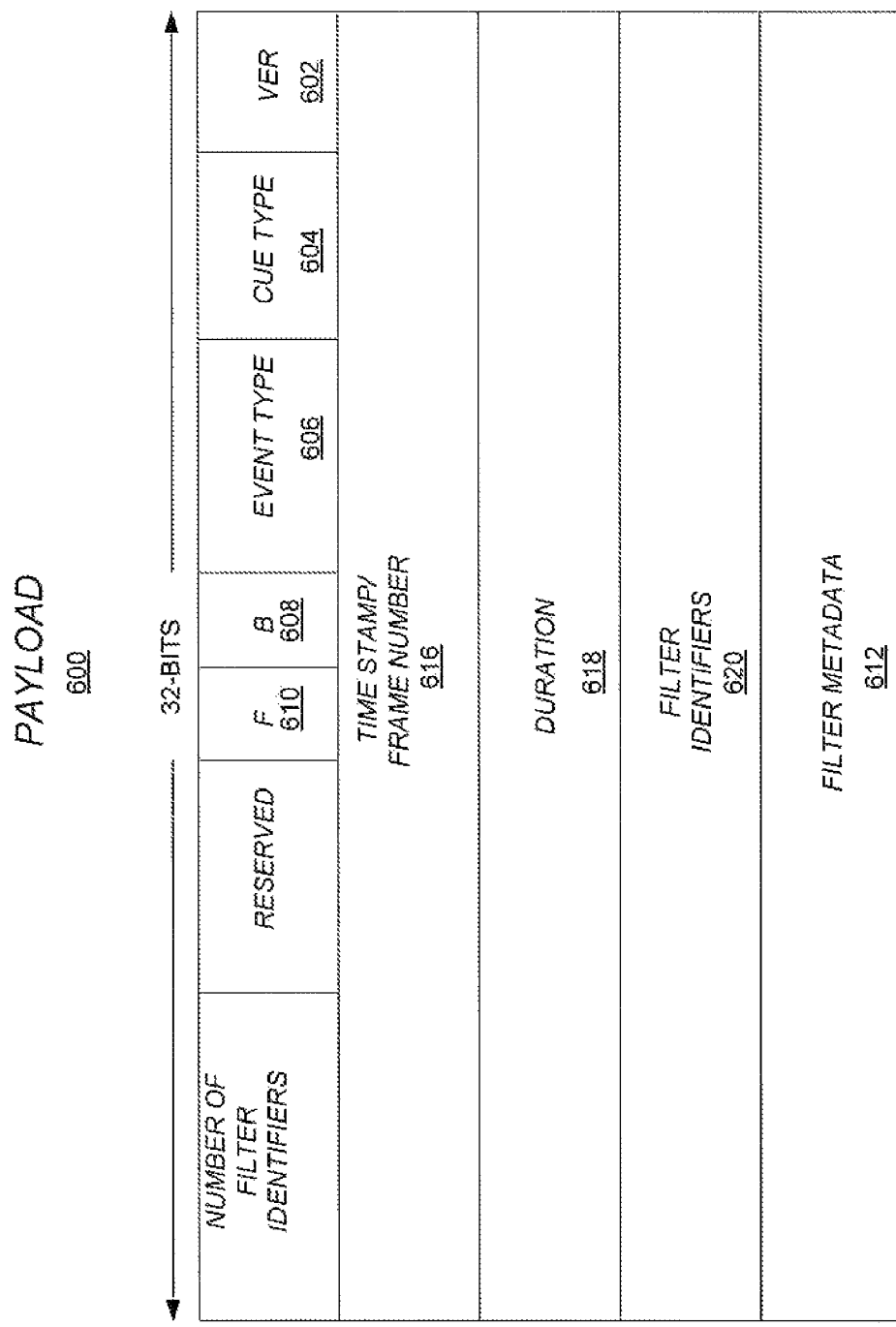
FIG. 6 is a diagram illustrating an example of the data structure for the payload of a cueing protocol.

FIG. 6 is a diagram illustrating an example of the data structure for the payload of a cueing protocol. The payload 600 includes a field 602 that indicates the version of the cueing protocol being used. The cue type 604 (e.g., EP, EN, EC, ET) and event type 606 (e.g., advertisement) is also included in the payload 600. A blanking indicator bit 608 may also be included in the payload 600 to indicate whether or not the main content broadcast from the transmitting unit includes a blanking interval for the advertisement. The payload 600 also includes another bit 610 which indicates whether or not any filter metadata 612. The filter metadata 612 is used by the processing component to add filters or modify the set of rules for existing filters. The payload 600 also includes a time stamp/frame number 616, which provides reference for the advertisement in relation to the main content. The duration field 618 discussed above is also included in the payload 600. Finally, a list of filter identifiers 620 is also included in the payload 600.

Returning to FIG. 2, the processing component 226 may insert default advertisements into the main content of the presentation when the cueing packets are lost. These default advertisements could also be used in the case of unscheduled extension to a presentation. The processing component 226 may apply various rules for selecting default advertisements. For example, the processing component 226 may insert advertisements into the main content at some periodic or variable interval. The processing component 226 may select default advertisements based on some predetermined hierarchy. For example, the processing component 226 may prioritize advertisements based on the age of the advertisements, those related to the equipment manufacturer of the access terminal, the service provider, the program content (i.e., metadata from the service guide), and/or any other suitable criteria. Alternatively, the processing component 226 may extrapolate a set of rules from previously received cueing packets.

Default advertisements may also be used when the user is channel surfing to prevent the user from averting advertisements. For example, if a user turns the channel during the presentation of an advertisement and returns before the advertisement slot is over, the processing component 226 may play a default advertisements using any of the rules discussed above. The processing component 226 may play default advertisements until an ET cue is received. The processing component 226 may also use the EC cues to facilitate the selection of default advertisements.

Figure 7:
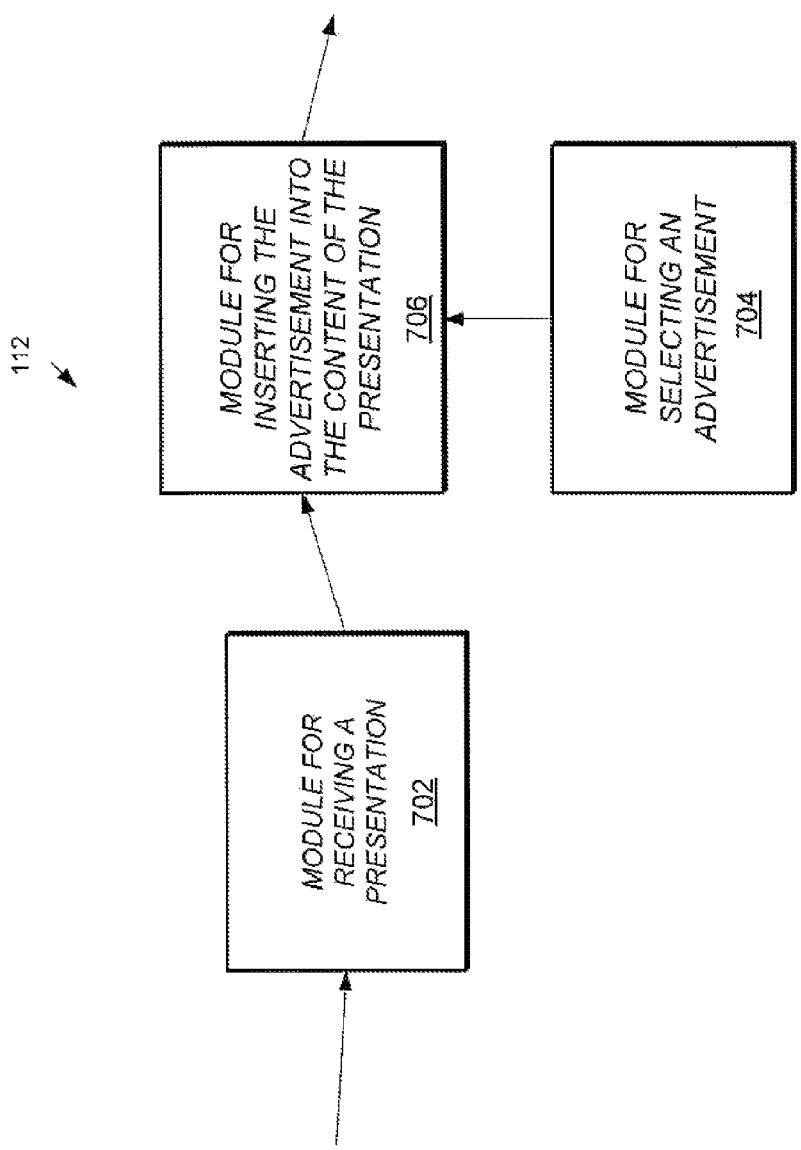
FIG. 7 is a diagram illustrating an example of the functionality of an access terminal.

FIG. 7 is a block diagram illustrating an example of the functionality of an access terminal. The access terminal 112 includes a module 702 for receiving a presentation having content. The access terminal 112 also includes a module 704 for selecting an advertisement and a module 706 for inserting the selected advertisement into the content of the presentation. The access terminal 112 further includes a module 708 for displaying the presentation with the selected advertisement.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more" All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An access terminal, comprising:
  a display configured to enable a user to view a presentation having content; and
  a processing component configured to:
    receive the presentation;
    display the content of the presentation;
    select an advertisement to insert into the content of the presentation before the presentation is provided to the display for viewing by the user;
    receive cueing information, wherein the cueing information includes a first cue configured to initiate processing of the selected advertisement and configured to indicate a time remaining before the selected advertisement is provided, a second cue configured to prompt inserting the selected advertisement into the presentation and configured to prompt beginning to display the selected advertisement, a third cue configured to indicate a time until completion of the selected advertisement after beginning to display the selected advertisement, and a fourth cue configured to prompt terminating the selected advertisement in order to resume display of the content of the presentation; and
    determine, based on the time remaining before the selected advertisement is provided and the time until completion of the selected advertisement, where in the presentation to insert the selected advertisement into the content.

2. The access terminal of claim 1 wherein the processing component is further configured to receive a plurality of advertisements, select the advertisement from the received advertisements, and cache the selected advertisement, the processing component being further configured to retrieve the selected advertisement from cache to insert into the content of the presentation.

3. The access terminal of claim 1 wherein the processing component is further configured to receive a plurality of advertisements, cache the received advertisements, and select the advertisement from the cached advertisements received by the processing component.

4. The access terminal of claim 1 wherein the processing component is further configured to receive a plurality of advertisements and select the advertisement from the received advertisements using a filter responsive to filtering criteria.

5. The access terminal of claim 4 wherein the processing component is further configured to receive metadata associated with each of the advertisements received, the filter being configured to select the advertisement by comparing the metadata with the filtering criteria.

6. The access terminal of claim 5 wherein the filtering criteria comprises a user profile.

7. The access terminal of claim 5 wherein the filtering criteria comprises metadata relating to a main content of the presentation.

8. The access terminal of claim 5 wherein the processing component is further configured to insert the selected advertisement in a specific spot in the presentation, and wherein the filtering criteria comprises metadata relating a value of the specific spot.

9. The access terminal of claim 1, wherein the processing component is further configured to receive a plurality of advertisements and select the advertisement from the received advertisements using a filter responsive to filtering criteria, the processing component being further configured to recover at least a portion of the filtering criteria from the cueing information.

10. The access terminal of claim 9 wherein said at least a portion of the filtering criteria recovered from the cueing information comprises metadata relating to a main content of the presentation.

11. The access terminal of claim 9 wherein the processing component is further configured to insert the selected advertisement in a specific spot in the presentation, and wherein said at least a portion of the filtering criteria recovered from the cueing information comprises metadata relating a value of the specific spot.

12. The access terminal of claim 9, wherein the processing component is further configured to use the cueing information to add, delete, or modify the filter.

13. The access terminal of claim 1 wherein the processing component is further configured to insert the selected advertisement into a blanking interval in the content of the presentation.

14. The access terminal of claim 1 wherein the processing component is further configured to insert the selected advertisement into the content of the presentation, and provide to the display the presentation with the selected advertisement and with delayed content following the selected advertisement.

15. The access terminal of claim 1, further comprising a tuner configured to allow the user to view a plurality of channels, and wherein the processing component is further configured to provide a default advertisement to the display when the user tunes from a first one of the channels during the presentation of the selected advertisement to a second one of the channels and then back to the first one of the channels.

16. The access terminal of claim 1 wherein the access terminal is a mobile phone.

17. The access terminal of claim 1, wherein the cueing information comprises a plurality of third cues temporally spaced apart to indicate a time remaining until the completion of the selected advertisement at different points in time during the selected advertisement.

18. The access terminal of claim 1, wherein the cueing information is utilized to adjust a playback speed of the selected advertisement.

19. The access terminal of claim 1, wherein the first cue is received at a prior time before the second and third cues are received.

20. The access terminal of claim 1, wherein the processing component is further configured to:
receive second cueing information, wherein the second cueing information includes a fifth cue that indicates a second time remaining before the selected advertisement is provided.

21. The access terminal of claim 20, wherein the second time remaining before the selected advertisement is less than the time remaining before the selected advertisement is provided as indicated in the first cue.

22. The access terminal of claim 20, wherein the fifth cue is received after the first cue.

23. An access terminal, comprising:
means for receiving a presentation having content;
means for displaying the content of the presentation;
means for selecting an advertisement;
means for receiving cueing information, wherein the cueing information includes a first cue configured to initiate processing of the selected advertisement and configured to indicate a time remaining before the selected advertisement is provided, a second cue configured to prompt inserting the selected advertisement into the presentation and configured to prompt beginning to display the selected advertisement, a third cue configured to indicate a time until completion of the selected advertisement after beginning to display the selected advertisement, and a fourth cue configured to prompt terminating the selected advertisement in order to resume displaying the content of the presentation;
means for determining, based on the time remaining before the selected advertisement is provided and the time until completion of the selected advertisement, where in the presentation to insert the selected advertisement into the content;
means for inserting the selected advertisement into the content of the presentation; and
means for displaying the presentation with the selected advertisement.

24. The access terminal of claim 23 further comprising means for receiving a plurality of advertisements, and wherein the means for selecting an advertisement is configured to select the advertisement from the received advertisements and means for caching the selected advertisement, the access terminal further comprising means for retrieving the selected advertisement from cache to insert into the content of the presentation.

25. The access terminal of claim 23 further comprising means for receiving a plurality of advertisements and means for caching the received advertisements, wherein the means for selecting an advertisement is configured to select the advertisement from the cached advertisements.

26. The access terminal of claim 23 further comprising means for receiving a plurality of advertisements and wherein the means for selecting an advertisement comprises means for filtering the received advertisements using filtering criteria to select the advertisement.

27. The access terminal of claim 26 further comprising means for receiving metadata associated with each of the advertisements received, wherein the means for filtering the received advertisements is configured to select the advertisement by comparing the metadata with the filtering criteria.

28. The access terminal of claim 27 wherein the filtering criteria comprises a user profile.

29. The access terminal of claim 27 wherein the filtering criteria comprises metadata relating to a main content of the presentation.

30. The access terminal of claim 27 further comprising means for inserting the selected advertisement in a specific spot in the presentation, and wherein the filtering criteria comprises metadata relating a value of the specific spot.

31. The access terminal of claim 23 further comprising means for tuning the access terminal to allow a user to view a plurality of channels, and means for providing a default advertisement to the means for displaying the presentation when the user tunes from a first one of the channels during the presentation of the selected advertisement to a second one of the channels and then back to the first one of the channels.

32. The access terminal of claim 23, further comprising:
means for receiving a plurality of advertisements, means for selecting the advertisement from the received advertisements using a filter responsive to filtering criteria; and
means for recovering at least a portion of the filtering criteria from the cueing information.

33. The access terminal of claim 32 wherein said at least a portion of the filtering criteria recovered from the cueing information comprises metadata relating to a main content of the presentation.

34. The access terminal of claim 32 further comprising means for inserting the selected advertisement in a specific spot in the presentation, and wherein said at least a portion of the filtering criteria recovered from the cueing information comprises metadata relating a value of the specific spot.

35. The access terminal of claim 32, further comprising means for using the cueing information to add, delete, or modify the filter.

36. The access terminal of claim 23 further comprising means for inserting the selected advertisement into a blanking interval in the content of the presentation.

37. The access terminal of claim 23 further comprising means for inserting the selected advertisement into the content of the presentation, and provide to the display the presentation with the selected advertisement and with delayed content following the selected advertisement.

38. The access terminal of claim 23 wherein the access terminal is a mobile phone.

39. The access terminal of claim 23, wherein the cueing information comprises a plurality of third cues temporally spaced apart to indicate a time remaining until the completion of the selected advertisement at different points in time during the selected advertisement.

40. The access terminal of claim 23 wherein the cueing information is utilized to adjust a playback speed of the selected advertisement.

41. A method of advertising by an access terminal, comprising:
receiving at a system including a processor a presentation having content;
displaying the content of the presentation;
selecting an advertisement;
receiving cueing information, wherein the cueing information includes a first cue configured to initiate processing of the selected advertisement and configured to indicate a time remaining before the selected advertisement is provided, a second cue configured to prompt inserting the selected advertisement into the presentation and configured to prompt beginning to display the selected advertisement, a third cue configured to indicate a time until completion of the selected advertisement after beginning to display the selected advertisement, and a fourth cue configured to prompt terminating of the selected advertisement in order to resume displaying the content of the presentation;

determining, based on the time remaining before the selected advertisement is provided and the time until completion of the selected advertisement, where in the presentation to insert the selected advertisement into the content;

inserting, using the system, the selected advertisement into the content of the presentation; and displaying, via the system, the presentation with the selected advertisement.

42. The method of claim 41 further comprising receiving a plurality of advertisements, and wherein the selection of an advertisement comprises selecting the advertisement from the received advertisements and caching the selected advertisement, the method further comprising retrieving the selected advertisement from cache to insert into the content of the presentation.

43. The method of claim 41 further comprising receiving a plurality of advertisements and caching the received advertisements, wherein the selection of an advertisement comprises selecting the advertisement from the cached advertisements.

44. The method of claim 41 further comprising receiving a plurality of advertisements, and wherein the selection of an advertisement comprises filtering the received advertisements using filtering criteria to select the advertisement.

45. The method of claim 44 further comprising receiving metadata associated with each of the advertisements received, wherein the filtering of the received advertisements comprises comparing the metadata with the filtering criteria.

46. The method of claim 45, wherein the filtering criteria comprises a user profile.

47. The method of claim 45, wherein the filtering criteria comprises metadata relating to a main content of the presentation.

48. The method of claim 45, further comprising inserting the selected advertisement in a specific spot in the presentation, and wherein the filtering criteria comprises metadata relating a value of the specific spot.

49. The method of claim 41 wherein the presentation is displayed on a first channel, the method further comprising tuning the access terminal from the first channel to a second channel during the display of the presentation, tuning back to the first channel, and displaying a default advertisement on the first channel after the access terminal is tuned back.

50. The method of claim 41, further comprising receiving a plurality of advertisements, selecting the advertisement from the received advertisements using a filter responsive to filtering criteria, and recovering at least a portion of the filtering criteria from the cueing information.

51. The method of claim 50 wherein said at least a portion of the filtering criteria recovered from the cueing information comprises metadata relating to a main content of the presentation.

52. The method of claim 50 further comprising inserting the selected advertisement in a specific spot in the presentation, and wherein said at least a portion of the filtering criteria recovered from the cueing information comprises metadata relating a value of the specific spot.

53. The method of claim 50 further comprising using the cueing information to add, delete, or modify the filter.

54. The method of claim 41 further comprising inserting the selected advertisement into a blanking interval in the content of the presentation.

55. The method of claim 41 further comprising inserting the selected advertisement into the content of the presentation, and provide to the display the presentation with the selected advertisement and with delayed content following the selected advertisement.

56. The method of claim 41, wherein the system comprises a mobile phone.

57. The method of claim 41, wherein the cueing information comprises a plurality of third cues temporally spaced apart to indicate a time remaining until the completion of the selected advertisement at different points in time during the selected advertisement.

58. The method of claim 41 wherein the cueing information is utilized to adjust a playback speed of the selected advertisement.

59. Non-transitory, tangible computer readable media containing a set of instructions for a processor to perform a method of advertising by an access terminal, the instructions comprising:

a routine to receive a presentation having content;
a routine to display the content of the presentation;
a routine to select an advertisement;
a routine to receive cueing information, wherein the cueing information includes a first cue configured to initiate processing of the selected advertisement and configured to indicate a time remaining before the selected advertisement is provided, a second cue configured to prompt inserting the selected advertisement into the presentation and configured to prompt beginning to display the selected advertisement, a third cue configured to indicate a time until completion of the selected advertisement after beginning to display the selected advertisement, and a fourth cue configured to prompt terminating the selected advertisement in order to resume display of the content of the presentation;
a routine to determine, based on the time remaining before the selected advertisement is provided and the time until completion of the selected advertisement, where in the presentation to insert the selected advertisement into the content;
a routine to insert the selected advertisement into the content of the presentation; and
a routine to provide to a display the presentation with the selected advertisement.

60. The non-transitory, tangible computer readable media of claim 59 wherein the access terminal is configured to receive a plurality of advertisements, and wherein the routine to select an advertisement comprises a routine to select the advertisement from the received advertisements and a routine to cache the selected advertisement, the instructions further comprising a routine to retrieve the selected advertisement from cache to insert into the content of the presentation.

61. The non-transitory, tangible computer readable media of claim 59 wherein the access terminal is configured to receive a plurality of advertisements, the instructions further comprising a routine to cache the received advertisements, and wherein the routine for selecting an advertisement is configured to select the advertisement from the cached advertisements.

62. The non-transitory, tangible computer readable media of claim 59 wherein the access terminal is configured to receive a plurality of advertisements, and wherein the routine to select an advertisement comprises a routine to filter the received advertisements using filtering criteria to select the advertisement.

63. The non-transitory, tangible computer readable media of claim 62 wherein the access terminal is configured to receive metadata associated with each of the advertisements received, wherein the routine to filter the received advertisements comprises a routine to compare the metadata with the filtering criteria.

64. The non-transitory, tangible computer readable media of claim 63 wherein the filtering criteria comprises a user profile.

65. The non-transitory, tangible computer readable media of claim 63 wherein the filtering criteria comprises metadata relating to a main content of the presentation.

66. The non-transitory, tangible computer readable media of claim 63 wherein the routine to insert the selected advertisement into the content of the presentation is further configured to insert the selected advertisement in a specific spot in the presentation, and wherein the filtering criteria comprises metadata relating a value of the specific spot.

67. The non-transitory, tangible computer readable media of claim 59 wherein the access terminal is tunable, and wherein the presentation is displayed on a first channel, the instructions further comprising a routine to provide to the display a default advertisement when the access terminal is tuned from the first channel to a second channel during the display of the presentation, tuned back to the first channel.

68. The non-transitory, tangible computer readable media of claim 59, further comprising instructions comprising a routine to receive a plurality of advertisements and select the advertisement from the received advertisements using a filter responsive to filtering criteria, and to recover at least a portion of the filtering criteria from the cueing information.

69. The non-transitory, tangible computer readable media of claim 68 wherein said at least a portion of the filtering criteria recovered from the cueing information comprises metadata relating to a main content of the presentation.

70. The non-transitory, tangible computer readable media of claim 68 wherein the routine to insert the selected advertisement into the content of the presentation is further configured to insert the selected advertisement in a specific spot in the presentation, and wherein said at least a portion of the filtering criteria recovered from the cueing information comprises metadata relating a value of the specific spot.

71. The non-transitory, tangible computer readable media of claim 68, further comprising instructions comprising a routine to use the cueing information to add, delete, or modify the filter.

72. The non-transitory, tangible computer readable media of claim 59 wherein the routine to insert the selected advertisement into the content of the presentation is further configured to insert the selected advertisement into a blanking interval in the content of the presentation.

73. The non-transitory, tangible computer readable media of claim 59 further comprising instructions comprising a routine to provide to the display the presentation with the selected advertisement and with delayed content following the selected advertisement.

74. The non-transitory, tangible computer readable media of claim 59 wherein the access terminal is a mobile phone.

75. The non-transitory, tangible computer readable media of claim 59, wherein the cueing information comprises a plurality of third cues temporally spaced apart to indicate a time remaining until the completion of the selected advertisement at different points in time during the selected advertisement.

76. The non-transitory, tangible computer readable media of claim 59 wherein the cueing information is utilized to adjust a playback speed of the selected advertisement.

* * * * *